United States Patent [19]

Steinke

[11] Patent Number: 5,244,498

[45] Date of Patent: Sep. 14, 1993

[54] CONCRETE MIXING DRUM CLEANING METHOD AND APPARATUS

[75] Inventor: Lloyd E. Steinke, North Delta, Canada

[73] Assignee: W. R. Grace & Co. of Canada Ltd., Vancouver, Canada

[21] Appl. No.: 682,494

[22] Filed: Apr. 9, 1991

[51] Int. Cl.$^5$ .................. C04B 40/00; B08B 9/093
[52] U.S. Cl. .................. 106/819; 106/708; 106/725; 106/727; 106/729; 106/804; 106/806; 106/808; 106/809; 106/823; 134/34
[58] Field of Search ............ 106/819, 708, 725, 727, 106/729, 804, 806, 808, 809, 823; 134/34, 22.18

[56] References Cited

U.S. PATENT DOCUMENTS

| | | | |
|---|---|---|---|
| 3,188,238 | 6/1985 | Lyon | 134/24 |
| 3,215,548 | 11/1965 | Vollick | 106/725 |
| 3,794,506 | 2/1974 | Schmidt | 106/717 |
| 3,833,011 | 9/1974 | McDermott et al. | 134/24 |
| 4,082,561 | 4/1978 | Nakagawa et al. | 106/819 |
| 4,190,454 | 2/1980 | Yamagisi et al. | 106/708 |
| 4,285,808 | 8/1981 | Horton | 209/17 |
| 4,341,232 | 7/1982 | Maton | 134/107 |
| 4,466,836 | 8/1984 | Crump et al. | 106/717 |
| 4,676,832 | 6/1987 | Childs et al. | 106/727 |
| 4,859,249 | 8/1989 | Valentini | 134/22.18 |
| 4,904,503 | 2/1990 | Hilton et al. | 106/692 |
| 4,964,917 | 10/1990 | Bobrowski | 106/804 |

*Primary Examiner*—Mark L. Bell
*Assistant Examiner*—Deborah Jones
*Attorney, Agent, or Firm*—Craig K. Leon; John Dana Hubbard; William L. Baker

[57] ABSTRACT

The present invention relates to a method of retarding the set of residual concrete in a concrete holding vessel comprising uniformly directing an aqueous solution containing an effective amount of a set retarding agent against the residual concrete on the inner surface of said concrete holding vessel with sufficient pressure to retard concrete set with less than about 3 gallons of aqueous solution per every 10 lbs. of residual concrete. The present invention also relates to an apparatus which utilizes a minimal amount of wash water.

7 Claims, 2 Drawing Sheets

CONCRETE MIXING DRUM CLEANING METHOD AND APPARATUS

FIELD OF THE INVENTION

This invention relates to a method and apparatus for cleaning drums used for mixing, storing, and/or transporting concrete and other cementitious slurries. In particular, the invention relates to an apparatus and method which utilizes a minimal amount of wash water to retard the set of residual concrete in containers.

BACKGROUND

Concrete is one of the most important building materials employed in modern construction. Concrete's strength, permanency and relatively low cost have made it one of the premier building materials today. Unfortunately, the popularity of concrete as a building material is not without its shortcomings. As many thousands of concrete mixing trucks return to the concrete yard every day, the residual concrete adhered to the walls of the mixing drum must either be retarded to prevent it from setting within the mixing drum, or washed out.

A current method of washing the drum interior involves the addition of approximately 200 liters of an aqueous set retarder solution, rotating and backing-up the rotation of the drum to the point of discharge three times. Next, the truck is parked until the next morning's concrete can be batched on top of the drum. This process resulted in four notorious problems. First, modern concrete drum mixing fins are too tall and will not allow the retarder solution to contact the entire fin surface. Second, 200 liters of solution is often impossible to batch on top of the next morning, especially at plants which used a premier or central mixer. Third, turning the drum back three times is a tedious process which many cement truck operators fail to do properly. Finally, during winter conditions, a 200 liter lump of ice is very hard to deal with.

As a result of these problems, many concrete companies merely rinse the drum with large amounts of water and dump the residual material into a settling pond. This process is riddled with potential environmental hazards to the ground water. Accordingly, a solution to these problems is needed.

U.S. Pat. No. 3,188,238 to Lyon, issued Jun. 8, 1965, discloses a method and apparatus for cleaning chemical tank trucks. The apparatus includes an air pressure driven spray head which is permanently mounted inside the tank, whereby high pressure fluid and air comingle and exit the nozzle openings to form a mist.

U.S. Pat. No. 3,833,011 to McDermott, et al., issued Sep. 3, 1974 discloses a method for cleaning service stations gasoline storage tanks by jet spraying a high viscosity cleaning fluid, such as aqueous cellulose gum solution, by means of a rotating nozzle over the interior surface of the tank with sufficient pressure to break lose rust and hydrocarbon deposits.

U.S. Pat. No. 4,285,808 to Horton, issued Aug. 25, 1981, discloses an elaborate apparatus for the separation of sand, gravel and cement from the washout water resulting from a concrete truck washout.

U.S. Pat. No. 4,341,232 to Maton, issued Jul. 27, 1982, discloses an apparatus for cleaning the interior of milk transporting tankers. The downward motion of a piston rod causes the spray arms of this apparatus to rotate.

U.S. Pat. No. 4,859,249 to Valentini, issued Aug. 22, 1989, discloses a cleaning process for removing material coated on the inner surface of an enclosed vessel, e.g., photographic emulsions, photopolymers, subbing layers, chemicals, etc. The process utilizes a rotating spray head which directs a liquid stream at a pressure of from 4,000 to 8,000 psi in a 360° solid angle using a fixed point as the angle vertex.

U.S. Pat. No. 4,964,917 to Bobrowski et al., issued Oct. 23, 1990 discloses a method of reclaiming leftover ready-mix concrete comprising the steps of (1) retarding the hydration of the unused portion returned from a job site, and (2) after the desired retardation period, adding a hydration acceleration agent to restore the concrete to a settable state.

It is an object of the present invention to provide a method and apparatus for retarding the set of residual concrete with a low amount of solution.

It is also an object of the present invention to provide a simple method for cleaning residual concrete from a concrete-containing vessel.

These and other objects will be described in more detail below.

SUMMARY OF THE INVENTION

The present invention relates to a method of retarding the set of residual concrete in a concrete holding vessel comprising uniformly directing an aqueous solution containing an effective amount of a set retarding agent against the residual concrete on the surface of said concrete holding vessel with sufficient pressure to retard concrete set with less than about 3 gallons of aqueous solution per every 10 lbs. of residual concrete.

The present invention also relates to an apparatus for retarding the set of residual concrete in a concrete holding vessel comprising an aqueous set retarding agent solution container, a means for applying pressure to the solution in said container, a rotatable solution spray head adapted to be inserted into said holding vessel, and a conduit means communication said container and said spray head, whereby the spray nozzle is introduced into said concrete holding vessel and pressure is applied to the solution in said container to direct said solution against the surface of said concrete holding vessel with sufficient pressure operative to retard the set of the residual concrete with less than about 3 gallons of aqueous solution per every 10 lbs. of residual concrete.

DETAILED DESCRIPTION OF THE INVENTION

Figure 1:
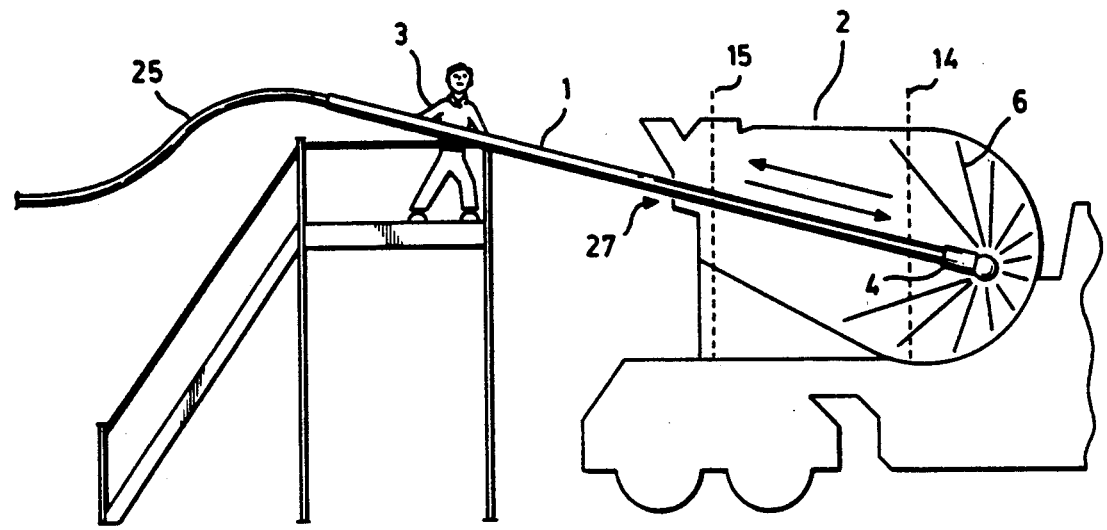
FIG. 1 is a vertical cross sectional depiction of the present apparatus, in use. It shows a wand-like assembly being inserted into a concrete mixing drum, whereby the wand head is equipped with a rotating spray nozzle for cleaning the drum and applying set retarder.

Applicant has discovered a method and apparatus for retarding the set of residual concrete in a concrete vessel which utilizes significantly less water than the current commercial practices. This invention involves directing a uniform, high pressure, low volume spray of an aqueous set retarding solution onto the concrete-coated interior of a concrete vessel.

The preferred embodiments of the present invention utilize a high pressure stream of set retarding solution at from about 50 to about 90 psig, preferably from about 60 to about 70 psig. The stream is preferably a jet stream. The stream must be directed in a rapid homogeneous manner to all surfaces of the concrete vessel interior; thus, contacting residual concrete. This may be accomplished with spray ball heads, rotating heads or any other design which will efficiently coat the residual concrete with an effective amount of retarder. This is preferably accomplished by directing the stream through a rotating nozzle assembly. In the most preferred embodiment, a rotating jet spray nozzle is used which produces the rotating effect as a result of the jet spray action. Other means of rotation may also be used, provided they result in a relatively uniform, homogeneous coating. Most preferred spray nozzles are Toftjorg Midget rotating spray heads of the type shown in FIG. 2, manufactured by Tofte and Jorgenson, Houston, Tex.

As was mentioned earlier, the present invention is used with an aqueous concrete set retarder solution. The preferred set retarders are phosphonic acid derivatives, more preferably those containing hydroxy and amino groups, which are capable of acting as calcium chelating agents. Other suitable retarders include hydroxycarboxylic acids and their salts, including citric, gluconic, tartaric, fumaric, itaconic, malonic and glucoheptanoic acids; polycarboxylic acids and their salts, e.g., polymaleic, polyfumaric, polyacrylic and polymethacrylic acids, preferably of low molecular weight; antioxidants, e.g., ascorbic acid, isoascorbic acid; polymers, e.g., suphonic acid-acrylic acid copolymers, polyhydroxysilanes and polyacrlyamide, preferably of low molecular weight; carbohydrates, e.g., sucrose and corn syrup; and lignosulphones, e.g., calcium lignosulphonates. Of these, the hydroxycarboxylic acids, polycarboxylic acids, ascorbic acid, soascorbic acid, carbohydrates and polyhydroxysilanes are preferred.

More preferred retarders are mixtures of at least one retarder of the phosphonic acid type with at least one retarder of a different type. As many of the non-phosphonic acid retarders e.g., citric acid also have water-reducing properties, these may also have the effect of increasing the compressive strength of the final set concrete.

Two popular commercialized products are RECOVER ® brand set retarder, distributed by W. R. Grace & Co.-Conn., Cambridge, Mass.; and DELVO brand set retarder, marketed by Master Builders Division of Sandoz Ltd., Basel, Switzerland. DELVO is a phosphonic acid type set retarder described in U.S. Pat. No. 4,964,917, issued Oct. 23, 1990 to Bobrowski et al. incorporated herein by reference. These materials are most preferred.

The "effective amount" of retarder varies as a function of temperature, the amount of water, desired retardation time, specific materials involved (admixtures, cement type and brand), and the type of retarder. Because materials and operating conditions vary from area to area, pretesting is required for selection of actual dosage rates. This determination is within the skill of one in this area. Once this dosage profile is established it can be reproduced without pretesting, provided the volume of dope is known. The volume of residual concrete should be fairly constant for a given container. As a general rule, Applicant has observed that from about 25 ounces to about 32 ounces of RECOVER ® brand set retarder, manufactured by W. R. Grace & Co.-Conn., Cambridge, Mass. 02140, diluted to 10 gallons with water is sufficent to retard the set of the residual concrete in a typical commercial concrete truck.

As used herein the term "residual concrete" shall mean the concrete coating which remains on the interior of a concrete holding vessel, storage vessel or transporting vessel after said vessel is emptied in the usual manner. Typically, the residual concrete in a conventional, commercial concrete mixer is about 500 lbs.

As used herein, the term "concrete holding vessel" means any tank or container used for holding, storing, mixing and/or transporting cementitious slurries. Preferred "concrete holding vessels" are concrete mixers. It should be noted that the accompanying drawings illustrate the use of the instant invention in combination with a truck although the concepts herein, when applied to stationary tanks, will be readily understood when considering the distribution of the illustrated embodiment.

As used herein, the term "concrete mixer" means any conventional batch, semi-batch or continuous concrete mixer which thoroughly mixed the cement and aggregates so as to obtain a homogeneous mass and coat all particles with cementitious paste. Preferred concrete mixers are rotating mixer, consisting of a revolving drum or a square box revolving about its diagonal axis and usually provided with deflectors and blades to improve the mixing. Mixers with opaque, metallic mixing drums are most preferred.

As depicted in FIG. 1, the set retarding solution distribution system of the present invention comprises a rigid pipe 1, preferably a schedule 40 or 80 aluminum pipe of sufficient length to allow the pipe to be inserted the entire length of the concrete holding vessel 2 and still leave sufficient pipe exposed for the apparatus operator 3 to hold on to. This pipe can be envisioned as a wand. Typically, this pipe is a ¾" pipe about 15 feet to about 20 feet in length. Thus, the wand-like feature provides a means for directing a nozzle head (described below) from the anterior of the wand 14 to the posterior 15. Aqueous set retarding solution is supplied to the pipe 5 at a pressure of from about 50 to about 90 psig, preferably from about 60 to about 70 psig.

The vessel-wise end of the wand is equipped with rotating head spray nozzle 4. The nozzle may be rotated by any means, but is preferably rotated by the force of the pressurized solution being sprayed in a manner similar to the rotation of lawn sprinkling devices. The jet 6 produced by the nozzles must be sufficient to produce a relatively uniform coating of aqueous set retarding solution onto the coating of residual concrete in the truck. More importantly the jet must produce this coating with less than about 3 gallons of aqueous solution per every 10 pounds (lb) of residual concrete, preferably less than about 2 gallons, most preferably less than about 1 gallon. When using a ¾" Toftjorg midget nozzle, of the type described in FIG. 2, to treat a typical industrial concrete mixing drum, this performance is typically achieved with a flow rate of about 10 gallons per minute of aqueous solution, at a pressure of about 65 psig with a period of about 1.5 mins.

Figure 2:
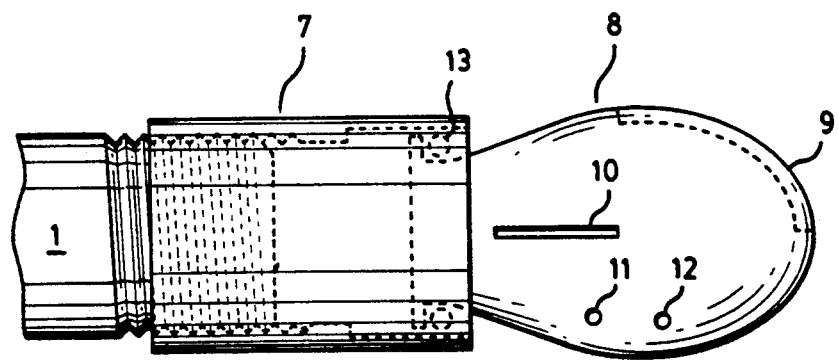
FIG. 2 depicts the preferred rotating nozzle head used in the present invention.

The Toftjorg midget head, FIG. 2, generally comprises a threaded inlet port 7 into which the wand 1 is turned, and a rounded head 8 comprising spray slots 9 and 10 which achieve 180° of spray, angled holes 11 and 12 to cause rotation of the head under pressure and a ball-bearing containing flange 13 for easy rotation of the head.

Figure 3:
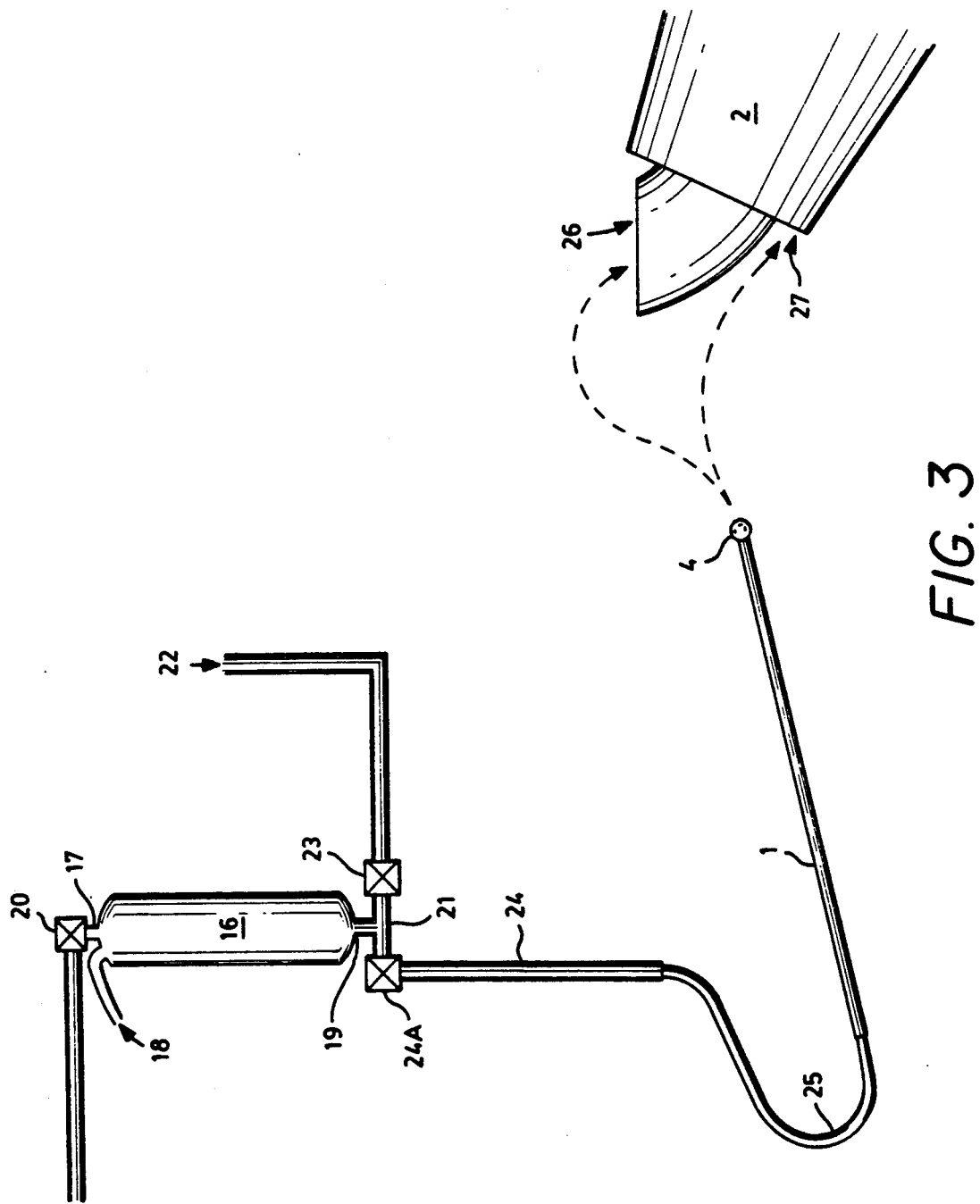
FIG. 3 is a schematic drawing of the preferred embodiment of the present invention.

The preferred embodiment of the present invention is shown in FIG. 3. A 15 gallon ASME Bottle 16 is fitted with an inlet port for liquid set retarder 17 an air inlet port 18 and a water inlet/discharge outlet at the bottle's bottom 19. The retarder inlet 17 is fixed with a ball valve 20. The air inlet 18 is connected to a "T" connector 21. One ⅜" arm of the "T" 21 is connected to a water line 22 through a ball valve 23 and the other ⅜" arm is connected to a ⅜" discharge pipe 24 through a ball valve 24a. The discharge pipe is connected to a ⅜" pressure rated rubber hose 25; which is ultimately connected to the wand 1 described above. It is important to note, that the flexible hose allows the operator to insert the wand through a cement truck hopper 26 or between the fins 27 of a mixing drum 2.

To operate the apparatus, valves ball valve 24a is closed and ball valve 23 is opened to fill the tank with 10 gallons of water. Valve 23 is then closed and valve 20 is opened to provide an appropriate metered volume of set retarder.

Valve 20 is then closed and the tank is pressurized with compressed air through inlet 18 to a pressure of from about 60 to about 70 psi. Finally, discharge valve 24a is opened and a high pressure stream of aqueous retarder solution is provided through 24, 25 and 1 to the spray nozzle. Preferably, the nozzle is placed in the tank 2 before the valve 24a is opened.

Referring again to FIG. 1, the nozzle head is positioned at the drum anterior 14 and the nozzle is slowly pulled back to the posterior 15. This step is repeated until the bottle 16 volume is nearly discharged, at which point the valve 24a is closed, the tank is vented through 10 and the tank is filled again for another use. It should be pointed out that the valve opening/closing and the pumping action of the present invention can be done manually or with the aid of microprocessor control system.

When this system is used for a conventional concrete mixer, one discharge is sufficient to wash a typical commercial concrete mixing truck drum interior. No further washing is required.

Surprisingly, it has been observed that this procedure, followed on a regular basis over a period of 3 to 6 weeks, will loosen much of the hardened concrete slivers in the corners of the mixer's drums and fins. The slivers will ultimately discharge and the drum will be significantly cleaner.

Although certain specific embodiments of the invention have been shown and described for use in a particular type of concrete holding vessel, it will be apparent in accordance with the broader aspect of the invention that various modifications and other embodiments are possible. For example, larger or smaller vessels and other spray nozzles can be used. Also, various cementitious compositions can be used. It is to be understood, therefore, that the invention is not limited to the specific arrangements shown, but in its broadest aspect, it includes all equivalent embodiments and modifications which come within the scope of the invention.

What is claimed is:

1. A method of retarding the set of residual concrete in a concrete mixing drum, comprising the step of jet spraying with a rotating nozzle an effective amount of a set retarding agent against residual concrete on the inner wall surfaces of said concrete mixing drum, said set retarding agent being selected from the group consisting of phosphonic acid derivatives, hydroxy and amino groups capable of acting as chelating agents, hydroxycarboxylic acids and their salts, polycarboxylic acids and their salts, antioxidants, polymers, carbohydrates, lignosulphones, and mixtures thereof, said set retarding agent having a concentration of 25-32 ounces per 10 gallons of water, the total volume of aqueous solution containing said set retarding agent being less than 10 gallons, said set retarding agent being jet sprayed at a pressure of 50-90 psig, whereby the set of said residual concrete is retarded by using less than 3 gallons of aqueous solution per every 10 lbs. of residual concrete.

2. A method according to claim 1 wherein the duration of jet spraying is less than 120 seconds.

3. A method according to claim 1 wherein, in said step of jet spraying, said rotating nozzle is mounted upon a wand.

4. A method according to claim 1 wherein, in said step of jet spraying, said rotating nozzle comprises spray slots.

5. A method according to claim 1 wherein, in said step of jet spraying, said cement mixing drum is mounted on a truck.

6. A method according to claim 3 further comprising the step of inserting said wand through a cement truck hopper.

7. A method according to claim 3 further comprising the step of inserting said wand between the fins of said concrete mixing drum.

* * * * *